(12) United States Patent
Kong et al.

(10) Patent No.: US 8,035,890 B2
(45) Date of Patent: Oct. 11, 2011

(54) PHASE STABILIZATION DEVICE FOR STIMULATED BRILLOUIN SCATTERING PHASE CONJUGATE MIRRORS AND LIGHT AMPLIFICATION APPARATUS USING THE SAME

(75) Inventors: Hong Jin Kong, Daejeon (KR); Bong Ju Lee, Daejeon (KR)

(73) Assignee: Korea Advanced Institute of Science and Technology (KR)

( * ) Notice: Subject to any disclaimer, the term of this patent is extended or adjusted under 35 U.S.C. 154(b) by 423 days.

(21) Appl. No.: 12/282,095

(22) PCT Filed: Mar. 7, 2007

(86) PCT No.: PCT/KR2007/001129
§ 371 (c)(1),
(2), (4) Date: Sep. 8, 2008

(87) PCT Pub. No.: WO2007/102706
PCT Pub. Date: Sep. 13, 2007

(65) Prior Publication Data
US 2009/0153950 A1    Jun. 18, 2009

(30) Foreign Application Priority Data
Mar. 8, 2006  (KR) .................. 10-2006-0021640

(51) Int. Cl.
*H01S 3/30* (2006.01)
(52) U.S. Cl. ....................................... 359/334
(58) Field of Classification Search ........... 359/334
See application file for complete search history.

(56) References Cited

U.S. PATENT DOCUMENTS 4,575,245 A * 3/1986 Borde ........................ 356/450
(Continued)

FOREIGN PATENT DOCUMENTS

WO  2005022234 A1  3/2005

OTHER PUBLICATIONS

Kong, H.J. et al., "Highly repetitive high energy/power beam combination laser: IFE laser driver using independent phase control of stimulated Brillouin scattering phase conjugate mirrors and pre-pulse technique", Laser and Particle Beams, vol. 23, (2005), pp. 107-111.

(Continued)

*Primary Examiner* — Eric Bolda
(74) *Attorney, Agent, or Firm* — Stuart H. Mayer; Mayer & Williams P.C.

(57) ABSTRACT

The object of this invention is to provide a phase stabilization device for stimulated brillouin scattering-phase conjugate mirrors and a light amplification apparatus using the phase stabilization device. A light amplification apparatus of the present invention includes a polarizer (70) for polarizing light beams reflected from a plurality of stimulated brillouin scattering-phase conjugate mirrors and causing the light beams to interfere with each other. A detector (80) acquires an interfering beam resulting from interference of the polarizer (70), and outputs the interfering beam. A phase controller (90) controls phase using the interfering beam acquired by the detector. Therefore, the apparatus of the present invention can stably lock the phase for a long period of time, and can be used in various industries and for scientific research in cases where a high repetition rate and high power are required.

9 Claims, 10 Drawing Sheets

U.S. PATENT DOCUMENTS

| | | | |
|---|---|---|---|
| 4,757,268 A * | 7/1988 | Abrams et al. | 359/338 |
| 4,998,259 A | 3/1991 | Chandra et al. | |
| 6,219,360 B1 | 4/2001 | Komine | |
| 6,385,228 B1 * | 5/2002 | Dane et al. | 372/99 |
| 6,693,943 B1 * | 2/2004 | Holzrichter et al. | 372/75 |
| 7,253,945 B2 | 8/2007 | Kong et al. | |
| 2003/0103534 A1 * | 6/2003 | Braiman et al. | 372/10 |
| 2006/0109878 A1 * | 5/2006 | Rothenberg | 372/35 |

OTHER PUBLICATIONS

Lee, S.K. et al., "Great improvement of phase controlling of the entirely independent stimulated Brillouin scattering phase conjugate mirrors by balancing the pump energies", Appl. Phys. Lett., vol. 87, (2005), pp. 161109.

* cited by examiner

FIG. 1

PRIOR ART

FIG. 2

PRIOR ART

PRIOR ART

FIG. 5

PRIOR ART

FIG. 6

PRIOR ART

FIG. 7

PRIOR ART

FIG. 8

FIG. 9

PHASE STABILIZATION DEVICE FOR STIMULATED BRILLOUIN SCATTERING PHASE CONJUGATE MIRRORS AND LIGHT AMPLIFICATION APPARATUS USING THE SAME

TECHNICAL FIELD

The present invention relates, in general, to a phase stabilization device and a light amplification apparatus including the phase stabilization device and, more particularly, to a phase stabilization device, which is used in a light amplification system using a stimulated brillouin scattering-phase conjugate mirror (hereinafter referred to as an 'SBS-PCM'), and a light amplification apparatus using the phase stabilization device.

BACKGROUND ART

Generally, since a stimulated brillouin scattering-phase conjugate mirror reflects a phase conjugate wave, it can compensate for distortion of a laser beam occurring during a laser amplification procedure. Therefore, a stimulated brillouin scattering-phase conjugate mirror can be very easily applied to a beam combination high power laser. Examples of a beam splitting amplification system using stimulated brillouin scattering-phase conjugate mirrors are described with reference to FIGS. 1 and 2.

Figure 1:
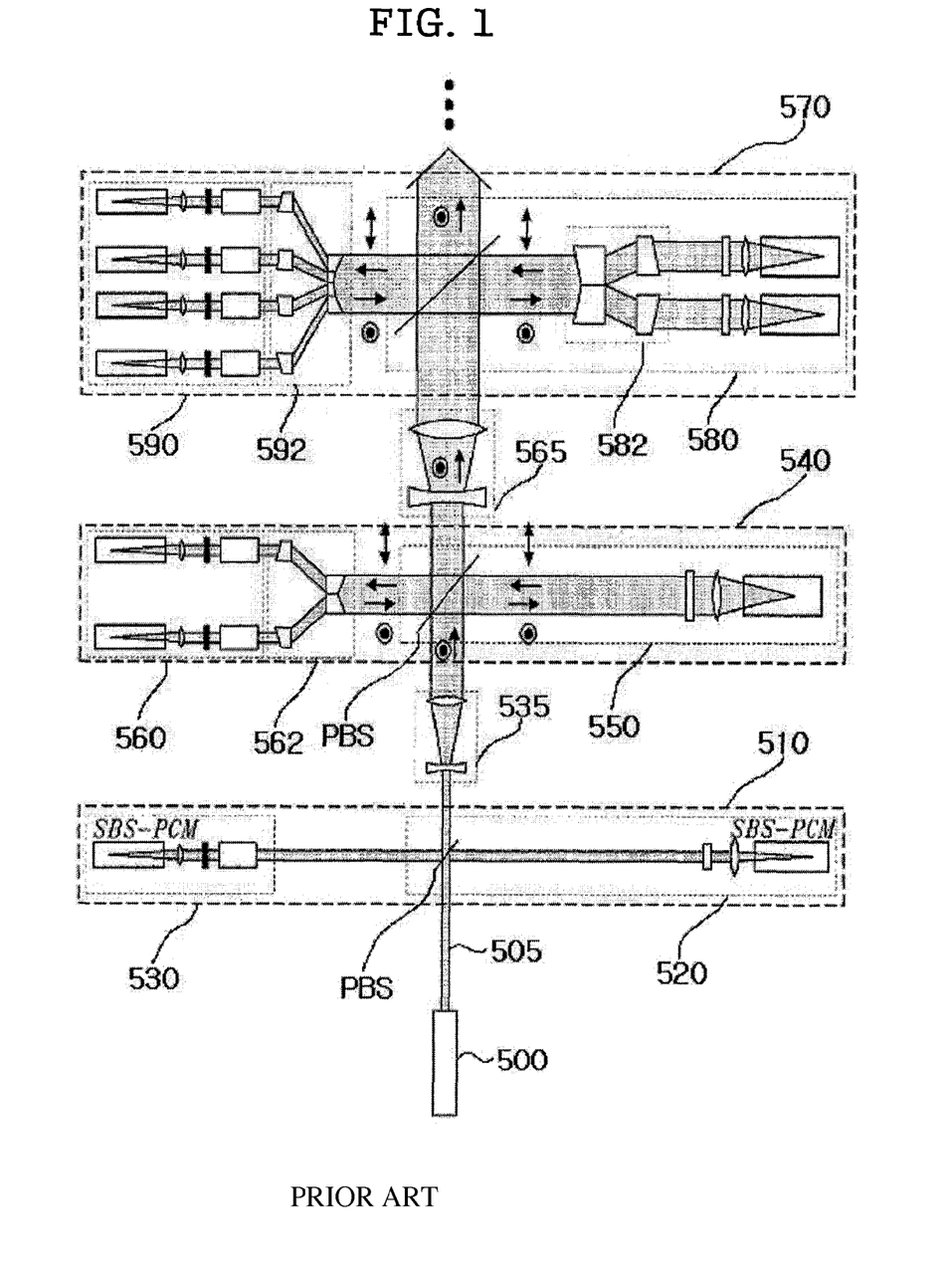
FIG. 1 is a diagram showing a conventional wavefront-dividing amplification system using stimulated brillouin scattering-phase conjugate mirrors.

FIG. 1 is a diagram showing a conventional wavefront-dividing amplification system using stimulated brillouin scattering-phase conjugate mirrors.

Referring to FIG. 1, light 505 emitted from a laser oscillator 500 is amplified and formed into more light beams while passing through a first light amplification stage 510, a second light amplification stage 540, and a third light amplification stage 570. That is, the light 505 is reflected from a Polarizing Beam Splitter (hereinafter referred to as a 'PBS'), is incident on a first beam blocker 520, and is reflected from a Stimulated Brillouin Scattering-Phase Conjugate Mirror (SBS-PCM). The reflected light passes through the PBS again and is incident on a first light amplifier 530. Thereafter, light incident on the first light amplifier 530 is amplified while passing through the first light amplifier 530. The amplified light is reflected from the SBS-PCM and is incident on the PBS. The PBS reflects the incident light and outputs the reflected light to an optical expander 535. The optical expander 535 expands the incident light and outputs the expanded light to the second light amplification stage 540. The second light amplification stage 540 is provided with a second beam blocker 550, which has the same structure as the first beam blocker 520 of the first light amplification stage 510, and which performs the same function. However, the second light amplification stage 540 further includes a wavefront-dividing beam splitter 562 disposed upstream of a second light amplifier 560. The second light amplifier 560 is formed in a 2×2 array. In this case, the wavefront-dividing beam splitter 562 is used to individually transmit light beams to components constituting the 2×2 array of the second light amplifier 560. That is, before light is incident on the second light amplifier 560, the wavefront of the light is divided by the wavefront-dividing beam splitter 562, and divided light beams are amplified by respective amplifiers arranged along optical axes thereof. The amplified light beams are reflected from an SBS-PCM, and are combined and incident on the PBS. The PBS reflects the incident light and outputs the reflected light to a beam expander 565. The beam expander 565 expands the incident light and outputs the expanded light to the third light amplification stage 570. In the third light amplification stage 570, a third light amplifier 590 is formed in a 4×4 array, and a third beam blocker 580 is formed in a 2×2 array. In this case, wavefront-dividing beam splitters 582 and 592 are used to transmit light to respective arrays.

When such a light amplification system is constructed, a desired number of amplification stages are successively connected to each other, thus not only freely increasing output energy without causing damage to the optical system, but also maintaining a repetition rate at a uniform level. That is, when energy density is increased due to continuous amplification, the optical system and laser gain media may be damaged if energy density is not decreased. Therefore, the expansion of laser light is required, but the size of the laser gain media must also be increased. This results in a decrease in the cooling rate of the laser gain media, and thus it is actually impossible to generate laser light having a high repetition rate. Therefore, the beam combination amplification apparatus of FIG. 1, which employs a method of increasing the size of laser light, but maintaining the size of gain media unchanged, has been used.

Figure 2:
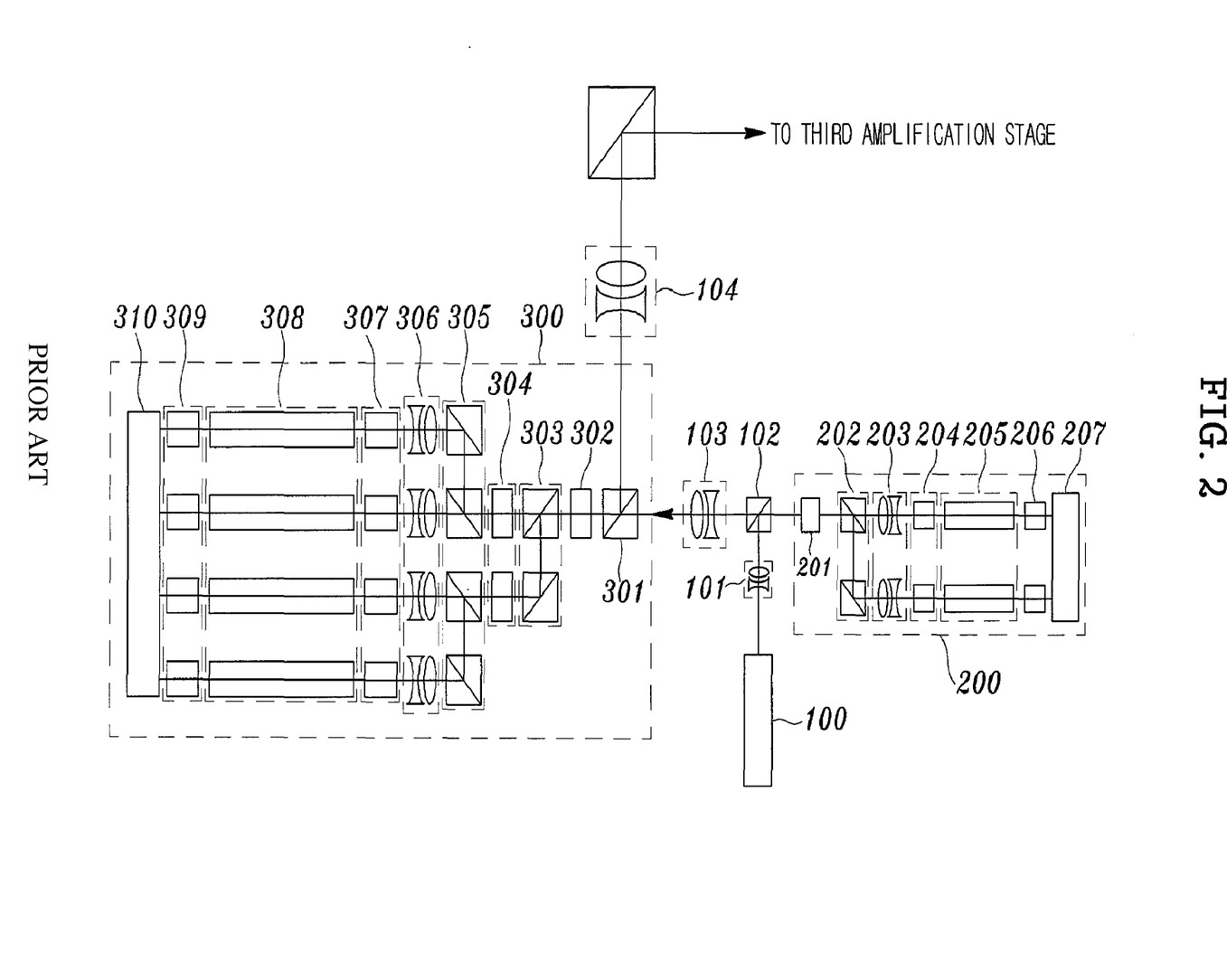
FIG. 2 is a diagram showing a conventional amplitude-dividing amplification system using stimulated brillouin scattering-phase conjugate mirrors.

FIG. 2 is a diagram showing a conventional amplitude-dividing amplification system using stimulated brillouin scattering-phase conjugate mirrors.

Referring to FIG. 2, the amplitude-dividing amplification system is constructed to include a laser oscillator 100 for generating laser light, a Beam Expander (BE) 101 for expanding the laser light, a PBS 102 for reflecting the expanded light, a first amplification stage 200 for amplifying the reflected light, a BE 103 for expanding the light amplified by the first amplification stage 200, a second amplification stage 300 for amplifying the light amplified by the first amplification stage 200 again, and a BE 104 for expanding the light amplified by the second amplification stage 300, and is constructed to allow the light amplified by the second amplification stage 300 to be output to a third amplification stage (not shown).

In the first amplification stage 200, devices for light amplification, that is, a quarter-wave plate 201, a PBS 202, a BE 203, a Faraday Rotator (FR) 204, an amplifier 205, an FR 206, and a Phase Locker (PL) 207, are arranged along an optical path. Further, in the second amplification stage 300, devices for light amplification, that is, a PBS 301, a quarter-wave plate 302, a PBS 303, a 45-degree rotator 304, a PBS 305, a BE 306, an FR 307, an amplifier 308, an FR 309, and a PL 310, are arranged along an optical path.

The light, which is output from the laser oscillator 100 and is S-polarized, is expanded by the BE 101 and is reflected from the PBS 102, and the reflected light is incident on the first amplification stage 200. The light incident on the first amplification stage 200 is converted into circularly polarized light while passing through the quarter-wave plate 201. The circularly polarized light is amplitude-divided by the PBS 202, and thus part of the circularly polarized light (P-polarized light) is reflected from the PBS 202 and the remaining part thereof (S-polarized light) passes through the PBS 202. P-polarized laser light and S-polarized laser light are individually amplified while passing through an optical path formed by the BE 203, the FR 204, the amplifier 205, the FR 206, and the PL 207, and then pass through or reflect from the PBS 202 in the same polarization states. The laser light beams are combined before the quarter-wave plate 201, and are circularly polarized, like that of the light before it was amplitude-divided. Thereafter, the circularly polarized light passes through the quarter-wave plate 201 and is converted into P-polarized laser light. Further, the laser light amplified in this way passes through the PBS 102 and is expanded through the BE 103.

Then, the light expanded by the BE 103 is incident on the second amplification stage 300. The second amplification stage 300 is operated to amplitude-divide the incident light into four light beams, combine the amplified light beams with each other, and output the combined light to a subsequent third amplification stage (not shown). The PBS 301 of the second amplification stage 300 outputs incident light to the quarter-wave plate 302. The PBS 303 amplitude-divides the light output from the quarter-wave plate 302, passes P-polarized laser light therethrough, reflects S-polarized laser light, and individually outputs the passed laser light and reflected laser light to the 45-degree rotator 304. In this case, in order to amplitude-divide a single laser light beam into two beams, a single 45-degree rotator 304 is connected to a combination of two PBSs 305, and thus a 2×2 array structure is formed. When the P-polarized and S-polarized light beams pass through the 45-degree rotator 304, the polarization of each beam is rotated by 45 degrees. Thereafter, each of the polarized beams is amplitude-divided into two beams by the subsequent optical device, that is, the PBS 305. A subsequent process is omitted because the same functions are performed on the same construction as that of the above-described first amplification stage 200. When the beams pass through and return to the 45-degree rotator 304, polarization is rotated by 45 degrees and then by −45 degrees, and thus there is no variation in polarization. Therefore, since amplitude division using the 45-degree rotator and the PBS can be infinitely performed, infinite energy amplification is possible if an additional amplification stage is provided after the second amplification stage 300.

Figure 3A:
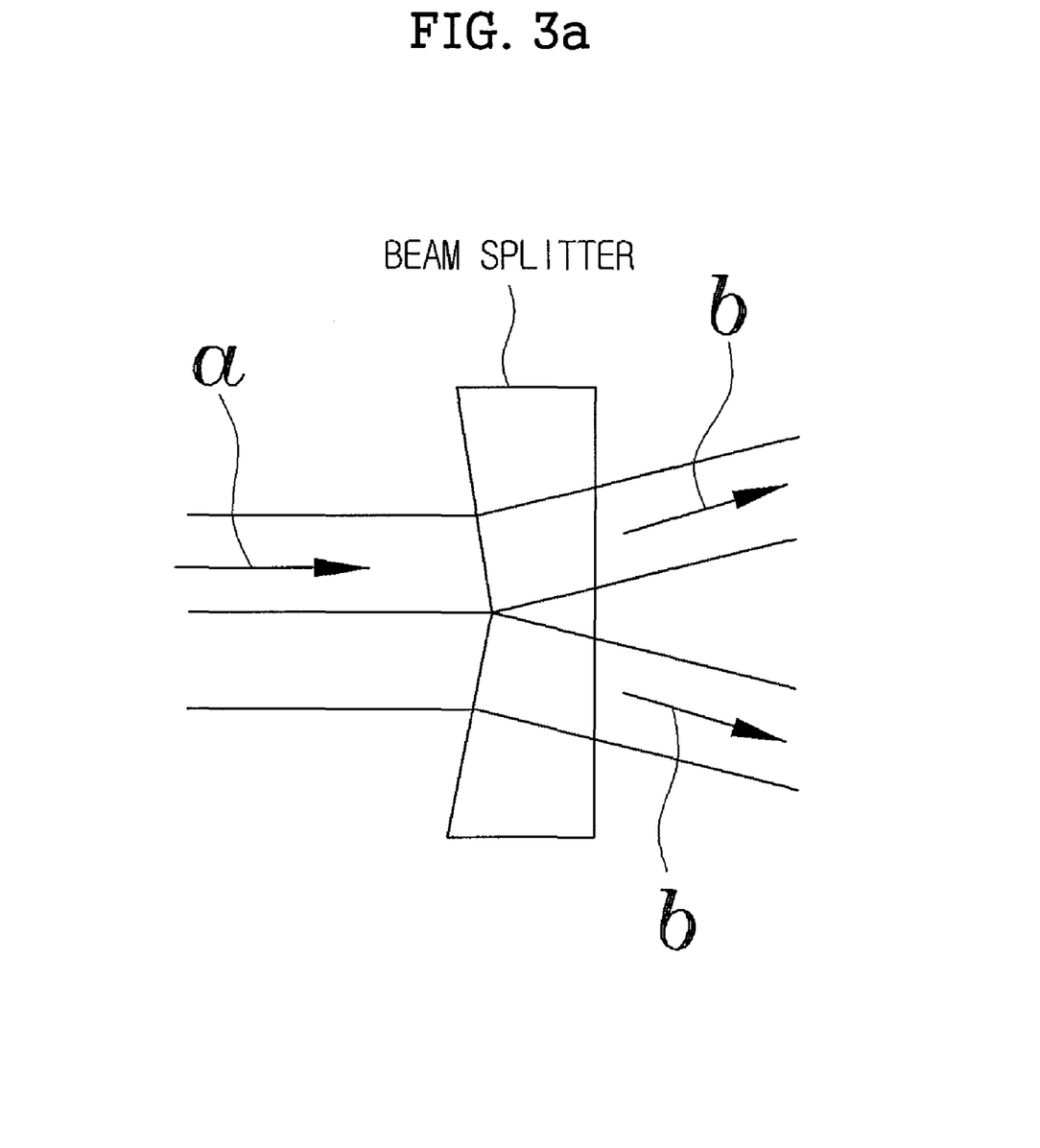
FIG. 3 is a diagram showing the comparison of an amplification dividing method with a wavefront dividing method.

The beam splitter used in the beam combination light amplification apparatus of FIG. 1 employs a wavefront dividing method, which is shown in FIG. 3a.

As shown in FIG. 3a, a wavefront-dividing beam splitter splits incident light a into two output beams b. That is, the wavefront dividing method divides laser light into two small laser beams.

Meanwhile, the beam splitter may use the amplitude dividing method of FIG. 2 in addition to the wavefront dividing method. This method is shown in FIG. 3b.

Figure 3B:
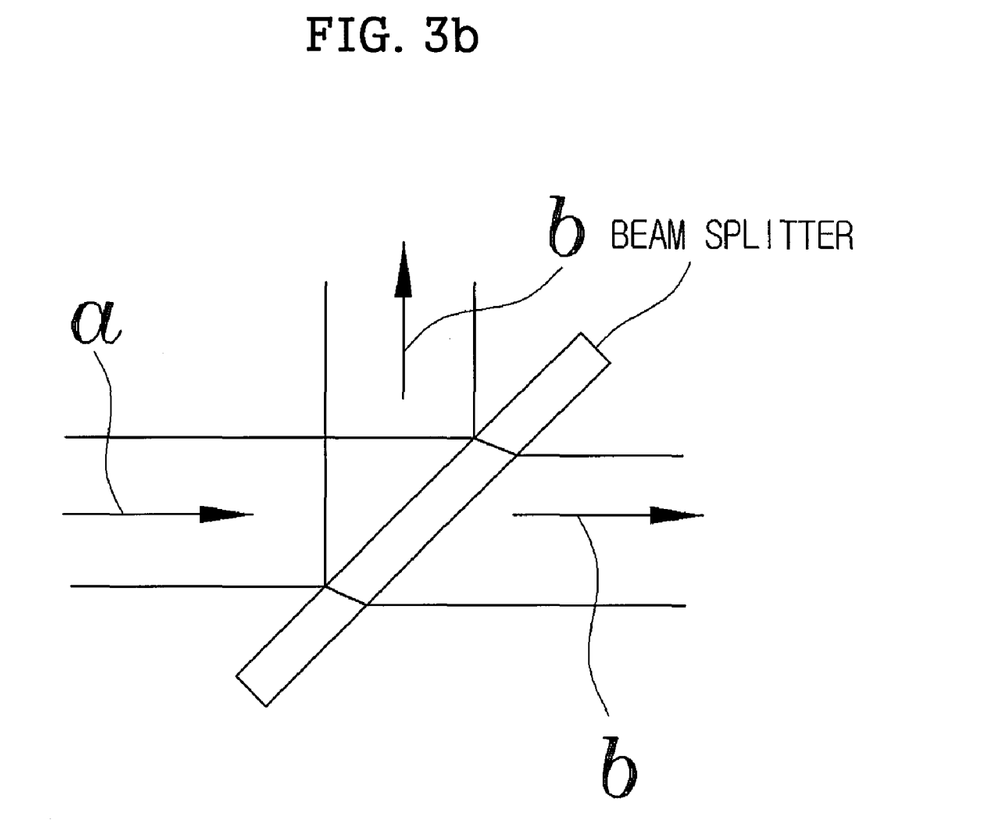

Referring to FIG. 3b, the amplitude-dividing beam splitter splits incident light a into two output beams b so that one output beam passes through the beam splitter and the other output beam is reflected from the beam splitter. That is, in the amplitude dividing method, two beams have only divided energy without changing the sizes thereof. Compared to the amplitude dividing method, the wavefront dividing method applied to the conventional light amplification apparatus cannot have a laser light shape identical to that of a main oscillator, so that there is difficulty in that the section of the gain medium of an amplifier must be processed in the shape of laser light. The reason for this is that, when the section of the gain medium is different from the shape of incident light, amplification efficiency may decrease. Further, the spatial distribution of laser light includes high spatial frequencies, and thus phase conjugation may be broken when reflection occurs through an SBS-PCM. Further, in the case where the phases of two beams are different from each other in areas where two beams intersect when the light beams are combined after being amplified, intensity spikes occur, thus deteriorating the spatial distribution of light.

However, since stimulated brillouin scattering is caused by random noise, a reflected beam has a random phase. Therefore, the combined laser beams have spatially different phase distributions. In the case of FIG. 1 (wavefront division), spike occurs at the boundary, and in the case of FIG. 2 (amplitude division), energy loss occurs. Therefore, in order to apply an SBS-PCM to a beam combination laser system, the phases of respective reflected beams are locked, and the phase difference between the phases must be zero.

Conventional methods of controlling the phases of the reflected beams of the SBS-PCM are described below.

Figure 4:
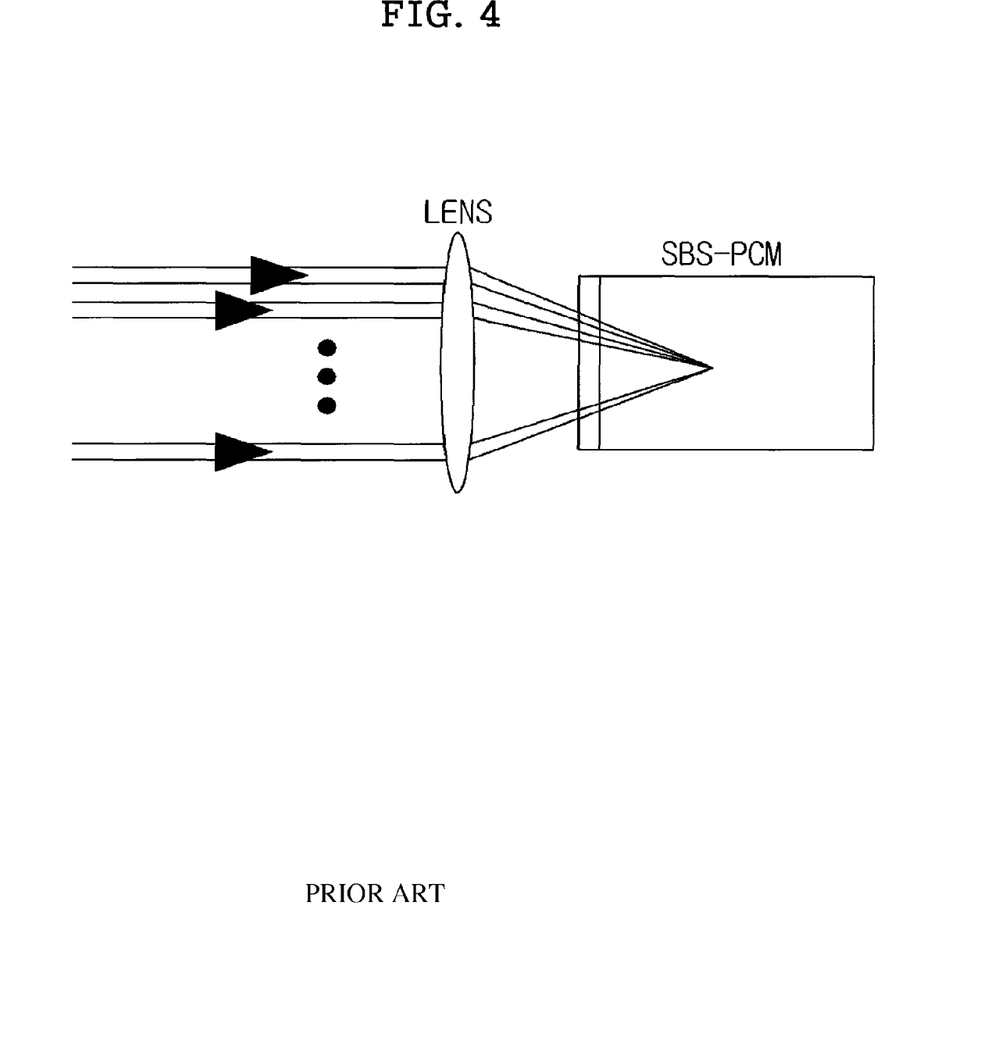
FIG. 4 is a configuration diagram showing a conventional phase locking method based on a focus-overlapping method using a conventional stimulated brillouin scattering-phase conjugate mirror.

FIG. 4 is a configuration diagram showing a conventional phase locking method based on a focus-overlapping method using an SBS-PCM.

Referring to FIG. 4, this method is implemented to focus a plurality of beams onto the scattering medium of a single SBS-PCM while overlapping the focuses of the beams with each other. That is, traveling beams are caused to pass through a condensing lens, and thus a plurality of beams is focused on the SBS-PCM while overlapping each other.

Figure 5:
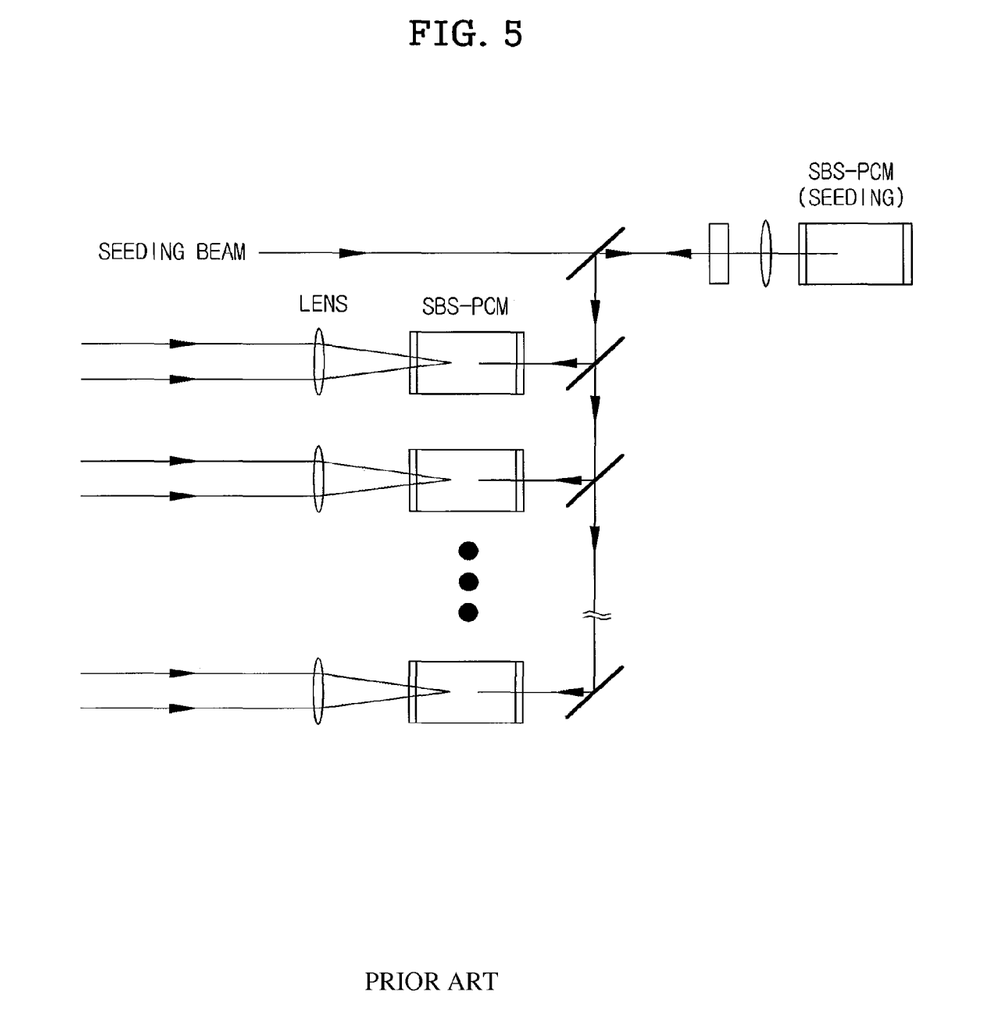
FIG. 5 is a configuration diagram showing a conventional phase locking method based on the back-seeding of a Stokes wave using a stimulated brillouin scattering-phase conjugate mirror.

FIG. 5 is a configuration diagram showing a conventional phase locking method based on the back-seeding of a Stokes wave using a stimulated brillouin scattering-phase conjugate mirror.

Referring to FIG. 5, the term "Stokes wave" means a laser beam having the same frequency as the reflected wave, which is reflected by stimulated brillouin scattering. This method is implemented to allow a back-seeding laser beam to pass through a focus, thus amplifying the back-seeding laser beam. That is, an incident seeding beam is incident on the SBS-PCM after passing through an optical path formed by optical devices, and is reflected from the SBS-PCM, so that a back-seeding laser beam is generated and amplified.

Figure 6:
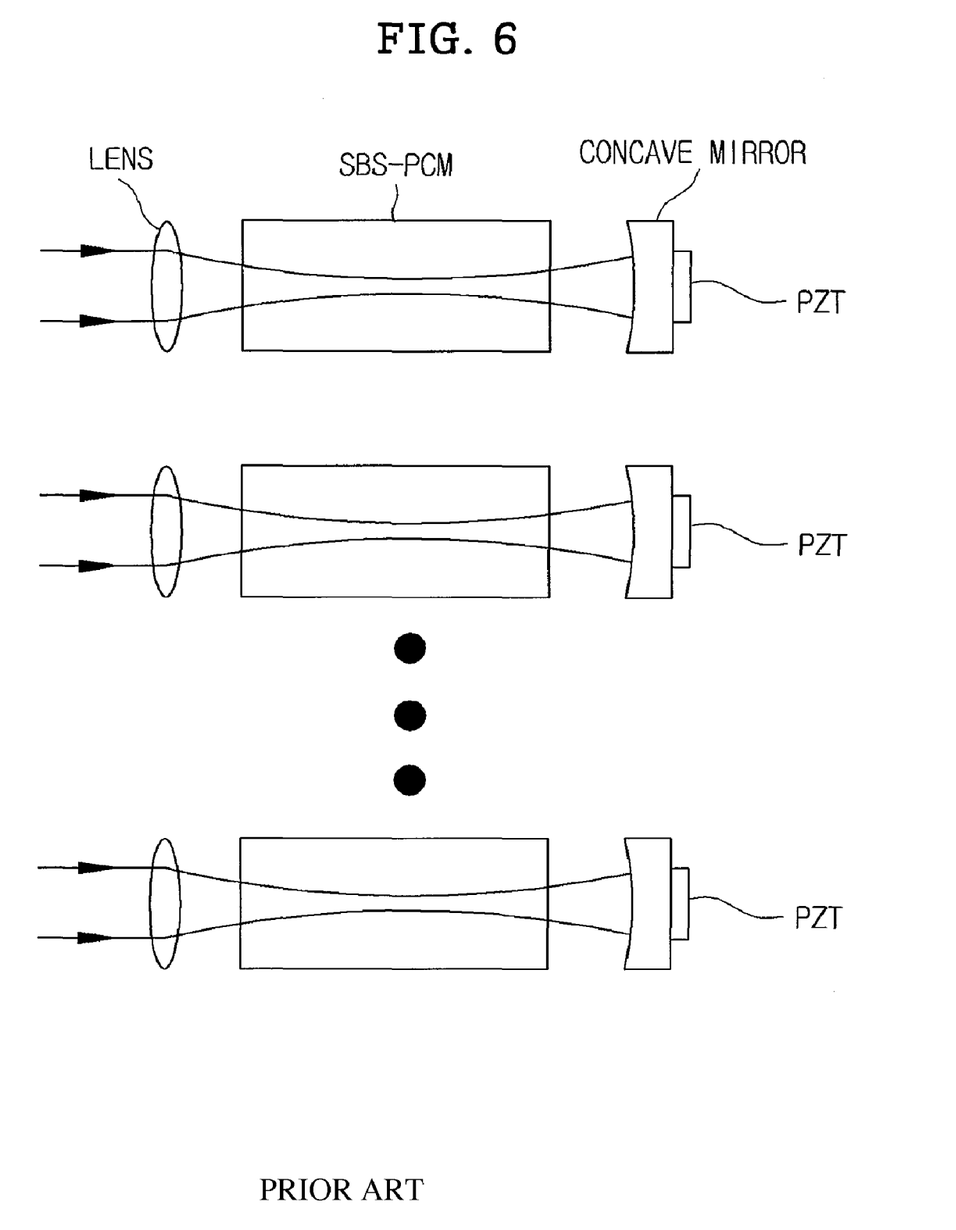
FIG. 6 is a configuration diagram showing a conventional first method of locking the phases of laser beams using stimulated brillouin scattering and self-beam feedback.
Figure 7:
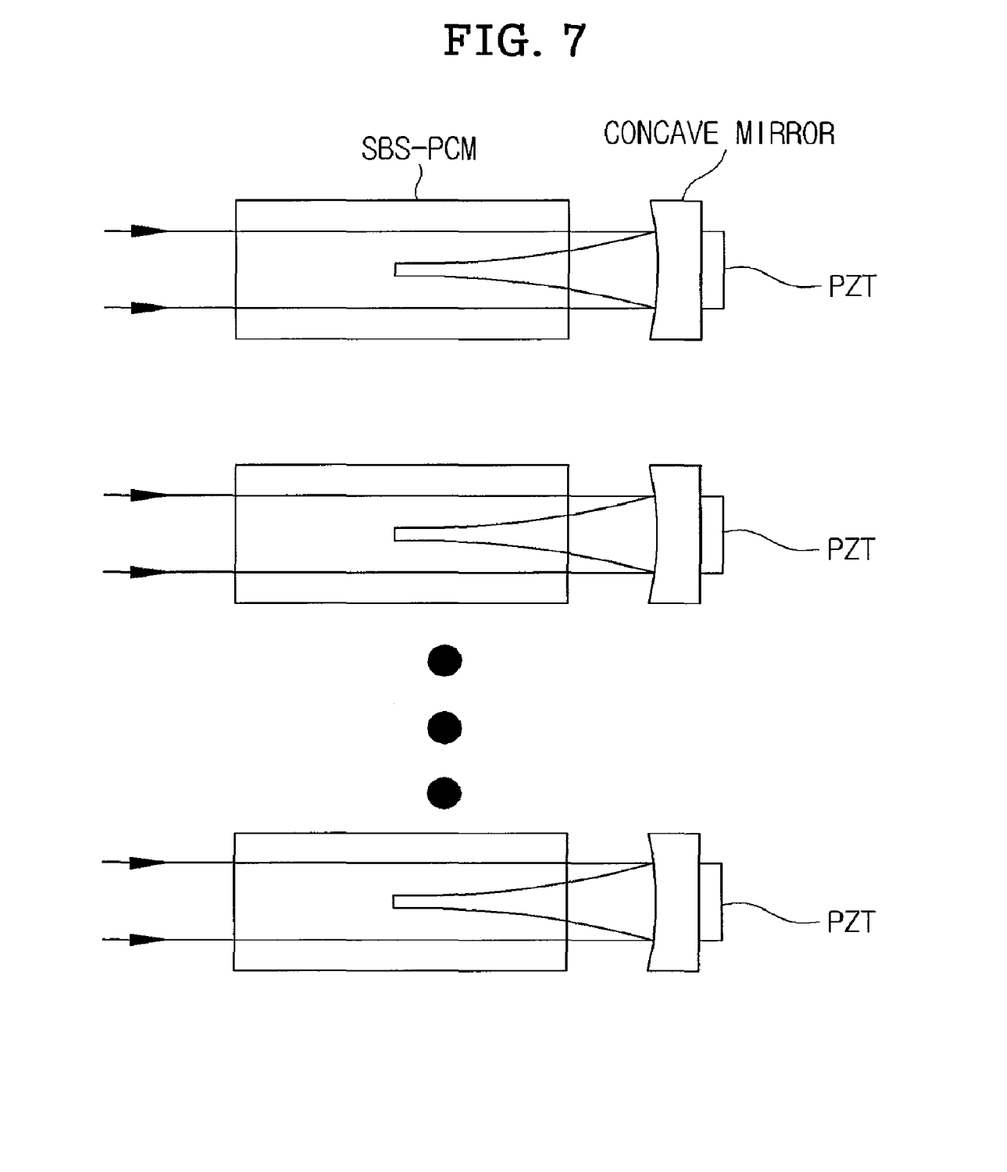
FIG. 7 is a diagram showing a conventional second method of locking the phases of laser beams using stimulated brillouin scattering and self-beam feedback.

FIG. 6 is a configuration diagram showing a conventional first method of locking the phases of laser beams using stimulated brillouin scattering and self-beam feedback, and FIG. 7 is a diagram showing a conventional second method of locking the phases of laser beams using stimulated brillouin scattering and self-beam feedback. That is, FIGS. 6 and 7 illustrate self-phase control methods of allowing incident laser beams to pass through SBS-PCM and to feed the laser beams back to stimulated brillouin scattering media using concave mirrors and Piezoelectric Transducers (PZT), thus controlling acoustic noise. In particular, the self-phase control methods are advantageous in that they can control the phases of stokes beams regardless of the number of beams.

However, in the beam combination laser system, short-term or long-term phase drift, occurring due to variation in density caused by the thermal effect of media on an optical path or the heterogeneity of density caused by convection current, and variation in optical path length caused by vibration and thermal expansion of optical devices, may be a problem, in addition to the random phases of stimulated brillouin scattering itself. However, in the conventional phase locking methods, since such a problem is not considered when the phase of a Stokes wave is controlled, the phase cannot be efficiently controlled.

Therefore, in order to sufficiently lock the phase of the reflected beam of the SBS-PCM, a new phase stabilization method is required in addition to the conventional phase control methods.

DISCLOSURE OF THE INVENTION

Accordingly, the present invention has been made keeping in mind the above problems, and an object of the present invention is to provide a stabilization device and a light amplification apparatus using the stabilization device, which enable sufficient phase control by utilizing a phase stabilization method using a feedback circuit, thus enabling a laser system having a high repetition rate and having high power to be manufactured.

In order to accomplish the above object, the present invention provides a phase stabilization device for a plurality of stimulated brillouin scattering-phase conjugate mirrors, comprising a polarizer for polarizing light beams reflected from the plurality of stimulated brillouin scattering-phase conjugate mirrors and causing the light beams to interfere with each other; a detector for acquiring an interfering beam resulting from interference of the polarizer and outputting the interfering beam; and a phase controller for controlling phase using the interfering beam acquired by the detector.

Preferably, the phase controller may control a position of a specific optical device (mirror) disposed downstream of the stimulated brillouin scattering-phase conjugate mirrors, or may control an angle of a specific optical device (glass plate) disposed on an optical path leading to the stimulated brillouin scattering-phase conjugate mirrors, thus controlling an optical path length.

Further, the present invention provides a light amplification apparatus using a plurality of stimulated brillouin scattering-phase conjugate mirrors, comprising a polarizing beam splitter for reflecting part of incident light and passing a remaining part of incident light therethrough according to polarization of the incident light; an amplification unit for amplifying light beams reflected from and passing through the polarizing beam splitter; and a phase control unit for controlling phases of the amplified light beams.

Preferably, the phase control unit may comprise a polarizer for polarizing the light beams reflected from the amplification unit and causing the reflected light beams to interfere with each other; a detector for acquiring an interfering beam resulting from interference of the polarizer and outputting the interfering beam; and a phase controller for controlling phase using the interfering beam acquired by the detector.

Preferably, the phase controller may control a position of a specific optical device (mirror) disposed downstream of the stimulated brillouin scattering-phase conjugate mirrors, or may control an angle of a specific optical device (glass plate) disposed on an optical path leading to the stimulated brillouin scattering-phase conjugate mirrors, thus controlling an optical path length.

BEST MODE FOR CARRYING OUT THE INVENTION

Hereinafter, embodiments of the present invention will be described in detail with reference to FIGS. 8 and 9.

Figure 8:
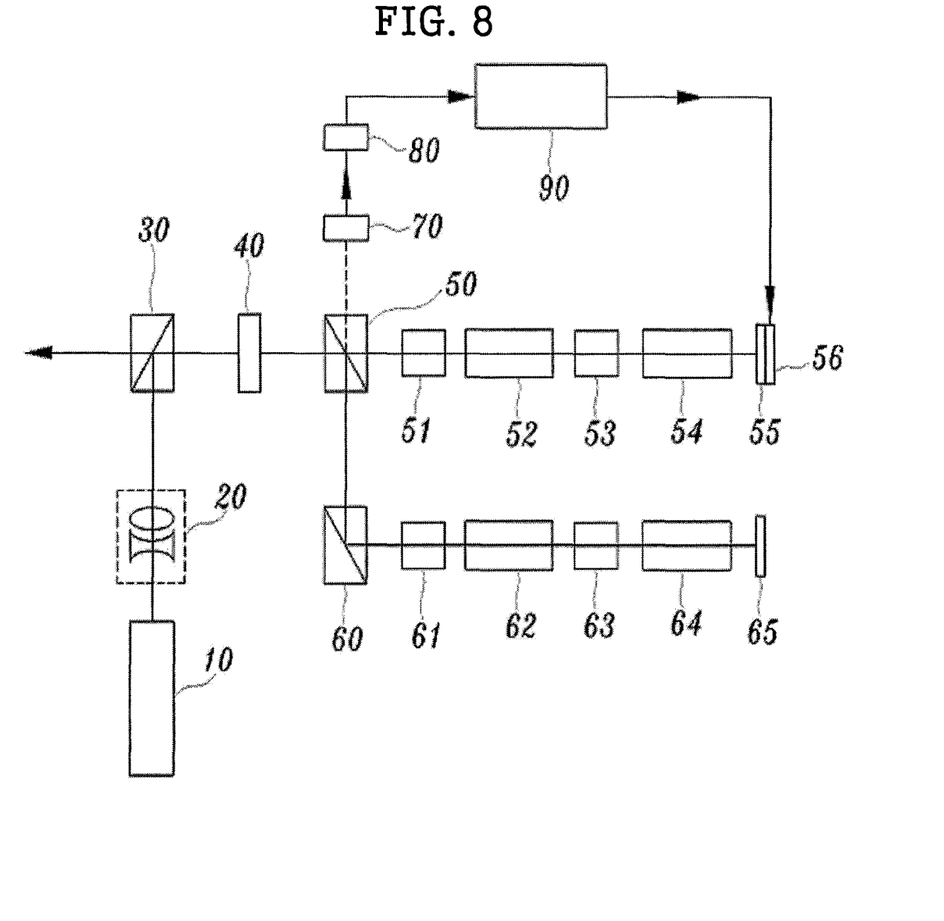
FIG. 8 is a diagram showing an amplification system using a stabilization device for stimulated brillouin scattering-phase conjugate mirrors according to an embodiment of the present invention.

FIG. 8 is a diagram showing an amplification system using a stabilization device for stimulated brillouin scattering-phase conjugate mirrors according to an embodiment of the present invention.

Referring to FIG. 8, the system splits a beam using an amplitude dividing method, and controls a Piezoelectric Transducer (PZT) 56 by feeding back a reflected beam using a phase control block, which includes a polarizer 70, a detector 80, and a phase controller 90, thus adjusting the position of a focus.

The system of FIG. 8 includes a laser oscillator 10 for generating laser light, a Beam Expander (BE) 20 for expanding the laser light, and a first Polarizing Beam Splitter (PBS) 30 for reflecting the expanded light. Further, an amplification block for amplifying the light reflected from the first PBS 30 includes second and third PBSs 50 and 60, first to fourth Faraday Rotators (FRs) 51, 61, 53 and 64, first and second amplifiers 52 and 62, first and second SBS-PCMs 54 and 64, first and second mirrors 55 and 65, and a PZT 56. Further, a phase control block for controlling the phase of amplified light includes the polarizer 70, the detector 80, and the phase controller 90 for controlling the position of the first mirror 55 to control the phase of light.

In FIG. 8, the system includes two light amplification blocks, one amplification block being indicated by reference numerals 50 to 56, and the remaining amplification block being indicated by reference numerals 60 to 65. In this case, a laser beam is amplitude-divided by the first PBS 30, and the divided beams are combined with each other. The beam, which is output from the laser oscillator 10 and is S-polarized, is expanded by the BE 20 and is reflected by the first PBS 30. Thereafter, the laser beam is converted into circularly polarized light while passing through a quarter-wave plate 40. Part of the circularly polarized light (P-polarized light) passes through the second PBS 50, and the remaining part thereof (S-polarized light) is reflected from the second PBS 50. The laser beam, which has passed through the second PBS 50 and is P-polarized, is amplified through an optical path which returns to the first FR 51 after passing through the first FR 51, the first amplifier 52, the second FR 53, the first SBS-PCM 54, the first mirror 55, and the PZT 56. The returned light is P-polarized, like that of the light before it was incident. The laser beam, which has been reflected from the second PBS 50 and is S-polarized, is reflected from the third PBS 60 and is returned to the third FR 61 after passing through the FR 61, the second amplifier 62, the fourth FR 63, the second SBS-PCM 64, and the second mirror 65. The returned reflected light is reflected from the third PBS 60. At this time, the reflected light is S-polarized, like that of the light before it was incident.

In this case, the laser beam, which has been amplified and is P-polarized, passes through the second PBS 50, the S-polarized laser beam is reflected from the second PBS 50, and the laser beams are combined with each other before the quarter wave plate 40. When the phases of the two beams to be combined are identical to each other, the combined beam is circularly polarized, like that of the beam before it was split. Thereafter, the circularly polarized beam passes through the quarter wave plate 40 and is converted into a P-polarized laser beam. Thereafter, the combined laser beam passes through the first PBS 30 and is expanded by the beam expander, and the expanded light is incident on a subsequent amplification stage.

In this case, a self-phase control method may be used as a phase locker for locking the phases of waves reflected from respective SBS-PCMs 54 and 64, but a feedback part, which is a separate phase control block, is added so that phase drift is also eliminated. Since part of the beam is leaked upwards from the second PBS 50, the phase control block allows this reflected beam (indicated by the dotted line) to pass through the polarizer 70, thus causing interference. In this case, the reflected beam includes two beams which are reflected from the first and second SBS-PCMs 54 and 64. The polarizer 70 polarizes the two reflected beams, thus acquiring an interfering beam. Thereafter, the detector 80 acquires the interfering beam obtained through the polarization of the polarizer 70, and outputs the interfering beam to the phase controller 90. The phase controller 90 controls the position of the first mirror 55 using the interfering beam, thus controlling the phase of the beam. That is, in order to make the energy of the interfering beam uniform, the position of the first mirror 55 having the PZT 56 attached thereto is adjusted, and thus the optical path length is adjusted.

Figure 9:
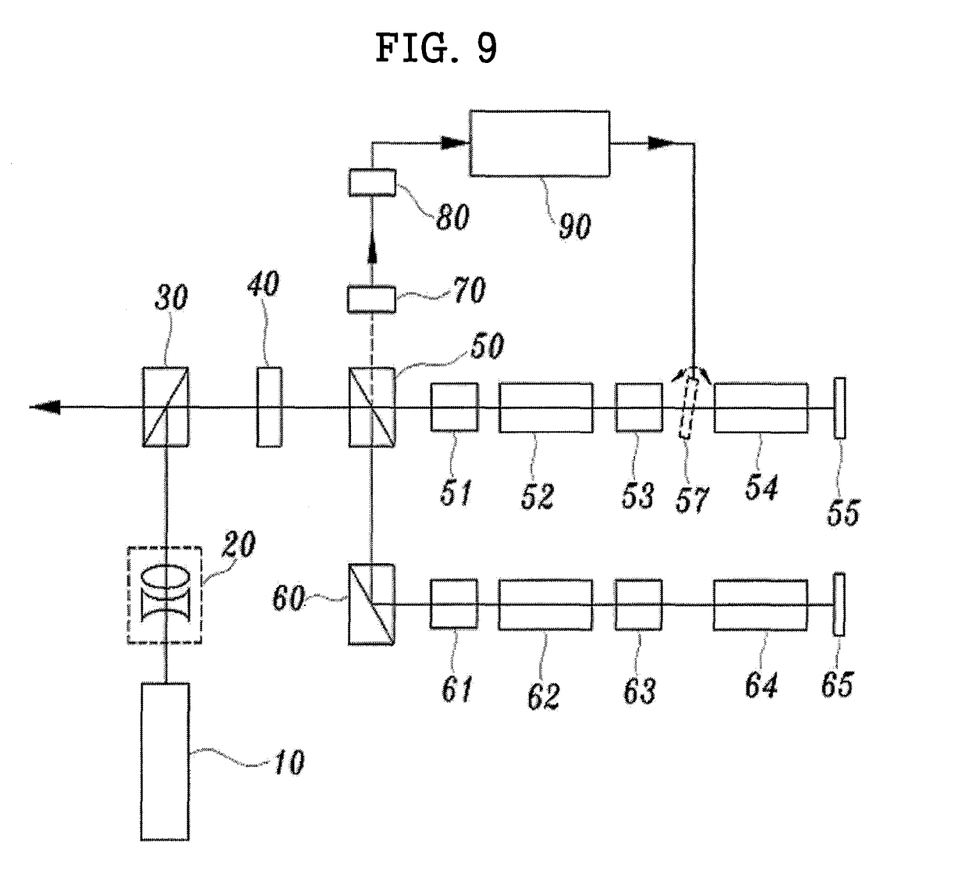
FIG. 9 is a diagram showing a basic amplification system using a stabilization device for stimulated brillouin scattering-phase conjugate mirrors according to another embodiment of the present invention.

FIG. 9 is a diagram showing a basic amplification system using a stabilization device for stimulated brillouin scattering-phase conjugate mirrors according to another embodiment of the present invention.

In FIG. 9, the inclination angle of a glass plate 57 is adjusted using a phase control block, and thus an optical path length is adjusted. FIG. 9 illustrates the system in which components using the same reference numerals as that of FIG. 8 are operated in the same manner, and which compensates for the phase drift of beams reflected from the first and second SBS-PCMs 54 and 64 by adjusting the optical path length using the phase control block. However, the system of FIG. 9 is different from that of FIG. 8 only in that the optical path length is adjusted by adjusting the inclination angle of the glass plate 57 placed on the optical path, instead of adjusting the position of the mirror disposed downstream of the first SBS-PCM 54. In this case, the glass plate 57 can be disposed upstream or downstream of the SBS-PCM 54.

As described above, the present invention includes all methods of compensating for phase drift of reflected waves of the SBS-PCM using a phase control block, and FIGS. 8 and 9 can be considered to be examples of the methods.

Both FIGS. 8 and 9 show methods of controlling optical path length by feeding back reflected beams through the phase control block, thus compensating for short-term or long-term phase drift occurring due to variation in density caused by the thermal effect of media or the heterogeneity of density caused by convection current, and variation in optical path length caused by the vibration and thermal expansion of optical devices. In this way, the present invention includes all methods of compensating for phase drift of reflected waves of the SBS-PCM using a feedback method. Therefore, when the device for stabilizing the phases of beams of the SBS-PCM according to the present invention is applied to a beam splitting laser amplifier, a laser system having no limitation with respect to energy amplification and having a high repetition rate and high power can be manufactured.

INDUSTRIAL APPLICABILITY

As described above, since the system of the present invention can stably lock the phase of light for a long period of time, it can be used in various industries and for scientific research in cases where a high repetition rate and high power are required.

The invention claimed is:

1. A phase stabilization device for a plurality of stimulated brillouin scattering phase conjugate mirrors, comprising:
   a polarizer for polarizing light beams reflected from the plurality of stimulated brillouin scattering-phase conjugate mirrors and causing the light beams to interfere with each other;
   a detector for acquiring an interfering beam resulting from interference of the polarizer and outputting the interfering beam; and
   a phase controller for controlling phase using the interfering beam acquired by the detector.

2. The phase stabilization device according to claim 1, wherein the phase controller controls a position of a specific optical device disposed downstream of the stimulated brillouin scattering-phase conjugate mirrors, thus controlling an optical path length.

3. The phase stabilization device according to claim 2, wherein the optical device is a mirror.

4. The phase stabilization device according to claim 1, wherein the phase controller controls an angle of a specific optical device disposed on an optical path leading to the stimulated brillouin scattering-phase conjugate mirrors, thus controlling an optical path length.

5. The phase stabilization device according to claim 4, wherein the optical device is a glass plate.

6. A light amplification apparatus using a plurality of stimulated brillouin scattering-phase conjugate mirrors, comprising: a polarizing beam splitter for reflecting part of incident light and passing a remaining part of incident light therethrough according to polarization of the incident light; a plurality of amplification units for amplifying the reflecting part of the incident light such that the amplified light passes through the polarizing beam splitter; and a phase control unit for controlling phases of the amplified light beams, wherein the phase control unit includes: a polarizer for polarizing the light beams reflected from the amplification units and causing the reflected light beams to interfere with each other; a detector for acquiring an interfering beam resulting from interference of the polarizer and outputting the interfering beam; and a phase controller for controlling phase using the interfering beam acquired by the detector to thereby control a position of a specific optical device disposed downstream of at least one of the stimulated brillouin scattering-phase conjugate mirrors, thus controlling an optical path length.

7. The light amplification apparatus according to claim 6, wherein the optical device is a mirror.

8. The light amplification apparatus according to claim 6, wherein the phase controller controls an angle of a specific optical device disposed, on an optical path leading to the stimulated brillouin scattering-phase conjugate mirrors, thus controlling an optical path length.

9. The light amplification apparatus according to claim 6, wherein the optical device is a glass plate.

* * * * *